Patented Nov. 20, 1923.

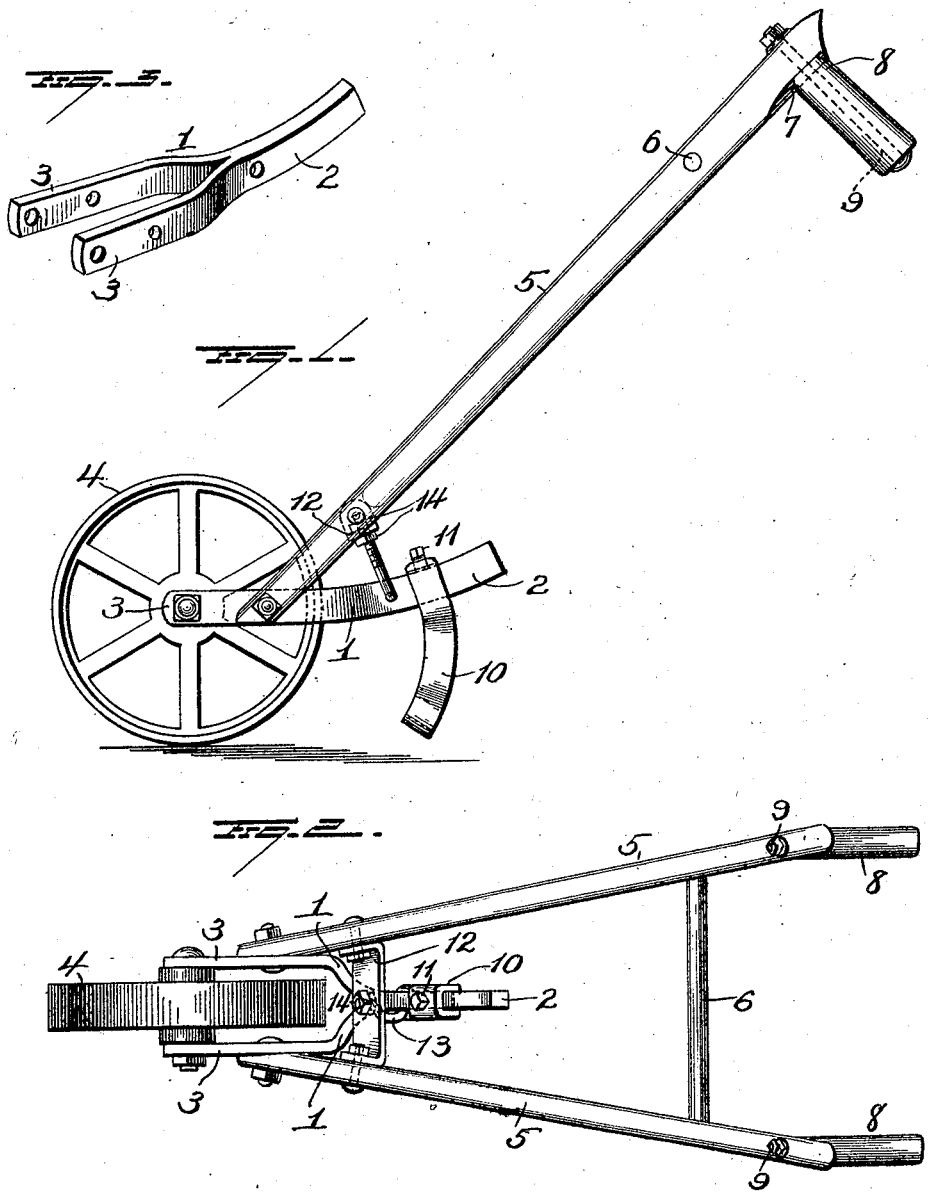

1,474,637

UNITED STATES PATENT OFFICE.

JOSEPH G. LUNDY, OF EVERGREEN, ALABAMA.

WALKING PLOW OR CULTIVATOR.

Application filed November 26, 1920. Serial No. 426,460.

*To all whom it may concern:*

Be it known that I, JOSEPH G. LUNDY, a citizen of the United States, and a resident of Evergreen, in the county of Conecuh and State of Alabama, have invented certain new and useful Improvements in Walking Plows or Cultivators; and I do hereby declare the following to be a full, clear, and exact description of the invention, such as will enable others skilled in the art to which it appertains to make and use the same.

This invention relates to improvements in walking plows or cultivators and more particularly to a structure of this type to be operated by one man and adaptable for use as a garden implement.

The object of my present invention is to provide a simple garden plow or cultivator in which the hand-holds are conveniently and securely attached to the handles and in which the handles as well as the standard carrying the earth-working member may be readily adjusted to adapt the implement for use by persons of different heights and according to the conditions to be met in plowing or cultivating a particular piece of ground.

With this and other objects in view, the invention consists in certain novel features of construction and combinations of parts as hereinafter set forth and pointed out in the claim.

In the accompanying drawings, Figure 1 is a side elevation of a garden implement embodying my improvements. Figure 2 is a plan view, and Figure 3 is a detailed view of the beam portion of the implement.

1 represents a plow or cultivator beam having a curved rearwardly extending portion 2 and a bifurcated forward portion forming two arms 3, 3, between the outer ends of which a ground wheel 4 is suitably mounted. Handles 5, 5, are pivotally attached to the bifurcated portion of the beam intermediate the ends of the respective arms thereof, and the handles normally assume a position diagonally disposed relatively to said beam. The handles 5, 5 are suitably spread apart and braced near their rear ends by a cross-bar 6. The underside of the handles at the rear ends thereof are made V-shape as indicated at 7 and enter similarly shaped sockets at the upper ends of depending hand-holds 8, the latter being rigidly secured to the handles by means of bolts 9 passing through the latter and entering or passing through said hand-holds.

A standard 10 which is preferably curved, is provided at its upper end with a suitable opening to receive the curved portion of the beam 1 and is adjustably secured to the latter by means of a thumb screw 11. The lower end of the standard 10 may also be provided with an opening for the accommodation of fastening means for a suitable earthworking member, such as a plow base or a shovel. It will be seen that by adjusting the standard on the curved beam the depth of penetration of the earth-working member may be varied.

A cross-bar 12 is secured between the handles over the beam and a short distance in rear of the wheel 4. The threaded upper end of a rod 13 passes freely through the cross-bar 12 and is adjustably clamped thereto by means of nuts 14—14 respectively above and below said cross-bar and the lower end of the rod is loosely attached to the beam 1. In effecting such attachment the lower portion of the rod 13 may be provided with a lateral arm passing freely through a hole in the beam. By means of the devices last above described, the handles may be adjusted up or down as occasion may require.

Having fully described my invention what I claim as new and desire to secure by Letters-Patent, is:

An agricultural implement comprising a beam having a bifurcated forward portion and a single upwardly curved rear portion, a wheel mounted in the forward bifurcated portion of the beam, a standard of an earthworking member having its upper end constructed to encircle the upwardly curved rear portion of the beam, means for securing the standard in a set position upon the upwardly curved portion of the beam, handles pivotally attached to the forward bifurcated portion of the beam, and an adjustable connection between the handles and the beam at a point in advance of the standard.

In testimony whereof, I have signed this specification in the presence of two subscribing witnesses.

JOSEPH G. LUNDY.

Witnesses:
MARY HENDERSON,
J. C. LUNDY, Jr.